US012269570B1

(12) United States Patent
Wang et al.

(10) Patent No.: US 12,269,570 B1
(45) Date of Patent: Apr. 8, 2025

(54) NAVIGATING AIRCRAFT IN A JETSTREAM

(71) Applicants: James C. Wang, Las Vegas, NV (US); Jane Wojcik, Brookline, MA (US); Michael Wojcik, Brookline, MA (US); Y. S. Hsu, Rancho Palos Verdes, CA (US)

(72) Inventors: James C. Wang, Las Vegas, NV (US); Jane Wojcik, Brookline, MA (US); Michael Wojcik, Brookline, MA (US); Y. S. Hsu, Rancho Palos Verdes, CA (US)

( * ) Notice: Subject to any disclaimer, the term of this patent is extended or adjusted under 35 U.S.C. 154(b) by 0 days.

(21) Appl. No.: 18/945,071

(22) Filed: Nov. 12, 2024

(51) Int. Cl.
 *B64B 1/02* (2006.01)
(52) U.S. Cl.
 CPC ..................... *B64B 1/02* (2013.01)

(58) Field of Classification Search
 CPC ........................................................ B64G 1/02
 See application file for complete search history.

(56) References Cited

U.S. PATENT DOCUMENTS

| 2012/0138733 A1* | 6/2012 | Hiebl | B64B 1/58 244/30 |
| 2022/0276055 A1* | 9/2022 | Candido | G08G 5/26 |
| 2025/0026504 A1* | 1/2025 | Sushko | B64B 1/44 |

\* cited by examiner

*Primary Examiner* — Richard G Davis
(74) *Attorney, Agent, or Firm* — Shuttleworth & Ingersoll, PLC; Jason R. Sytsma

(57) ABSTRACT

An altitude movement device comprising of a ballonet within an outer envelope with the ballonet configured to control buoyancy and an apparent wind generating device combined with the altitude movement device to generate an apparent wind to propel the vehicle laterally with respect to the direction of the jet stream.

21 Claims, 11 Drawing Sheets

NAVIGATING AIRCRAFT IN A JETSTREAM

TECHNICAL FIELD

This invention relates generally to systems and methods for jet stream navigation, and, more specifically, this disclosure relates to use of aerial vehicles for lateral navigation within the jet stream.

BACKGROUND INFORMATION

Jet streams are relatively narrow bands of strong wind in the upper levels of the atmosphere. These winds blow from west to east but the flow often shifts to the north and south to follow the boundaries between hot and cold air. The motions of the jet streams are caused by the rotation of the Earth towards the sun with warm air rising at the equator and dispersing towards the poles. The actual appearance of jet streams result from complex interaction between many variables, such as the locations of high and low pressure systems, warm and cold air, and seasonal changes. The jet streams meander around the globe, like a river of air, dipping and rising in latitude and longitude, splitting at times and forming eddies.

Jet streams are largely responsible for changes in the weather across the globe. Storms are guided west-to-east due to the jet streams with some areas remaining dry and others rarely seeing the sun. During the winter, in the Northern hemisphere, the polar jet stream can dip bringing frigid artic air. During the summer, the jet stream can rise bringing hot humid air from the equator.

Airplanes also experience the impact of the jet stream on flight time. The time of a transatlantic flight between the U.S. and Europe can differ by several hours depending on the direction the aircraft is flying. A flight from west to east often has a jet stream tail wind, as opposed to a jet stream head wind, when flying from east to west. To conserve fuel and reduce flight time, aircraft navigators will attempt to take advantage of the tail wind or avoid a strong headwind.

Scientists have been tracking the jet stream for nearly one hundred years. Twice a day every day at hundreds of locations around the world, meteorologists launch weather balloons with instruments to take various measurements, such as air temperature, air pressure, dew point temperature, wind direction and wind speed. These measurements are communicated back to terrestrial base stations with sophisticated modeling software to predict the jet stream path and long range weather forecasts.

The data collection, however, is imperfect. Numerous discrete observations are taken and compiled to create predictions. The weather balloons rise and fall over a brief 100-200 mile path leaving much of the jet stream unmeasured. The vast Pacific ocean is left virtually unmeasured due to the lack of land masses from which to launch the balloons. While the models attempt to fill in the gaps with predictions, as described above, the jet stream is unpredictable. The river of air splits, dips and rises in altitude and latitude, and can form complex eddy currents, leaving all of these changes undetected.

With jet stream data having wide implications for weather prediction, personal and commercial transportation, and national security, there is a need for more accurate jet stream data collection.

The problem with current unpowered, jet stream navigation is that the weather balloons can only rise and fall (given the size and cost constrains for such aerial vehicles). With so much variation in wind speed, wind direction, pressure variations, etc, the weather balloon cannot remain in the jet stream for long. Like flotsam in a river, the weather balloon quickly glides out of the jet stream path and falls to the ground. What these and other aerial vehicles lack is lateral movement control in relation to the jet stream, i.e., the ability to maneuver horizontally to remain in the center of the stream to be continuously carried with the jet stream. With appropriate lateral maneuverability, the vehicle ought to be able to circumnavigate the globe, which could greatly improve our jet stream models.

SUMMARY

In light of the obstacles discussed above, this disclosure seeks to improve the collection of data from the jet stream in order to improve weather prediction, personal and commercial transportation, and national security. Accordingly, in accordance with one aspect of the present invention, a lighter-than-air vehicle ("LAV") for navigating a jet stream comprises of an altitude movement device comprising of a ballonet within an outer envelope with the ballonet configured to control buoyancy; and an apparent wind generating device combined with the altitude movement device to generate an apparent wind.

In one embodiment, the apparent wind generating device is a motorized propeller oriented to propel the vehicle laterally with respect to the direction of the jet stream. A rotational motor can be connected to the motorized propeller to rotate the motorized propeller between two-perpendicularly oriented positions with respect to the direction of the jet stream to propel the vehicle laterally with respect to the direction of the jet stream. Alternatively, a rotational motor can be connected to the outer envelope to spin the outer envelope in either a clockwise or counter-clockwise direction to move the aerial vehicle laterally with respect to the direction of the jet stream, wherein the motorized propeller is oriented in the direction of the jet stream to generate apparent wind while the rotational motor spins the outer envelope. A motorized stabilizing rotor can be combined to a tail extending from the motorized propeller.

In an embodiment, the apparent wind generating device is a drag balloon that extends at a higher altitude than the outer envelope. A rotational motor can be connected to the outer envelope to spin the outer envelope in either a clockwise or counter-clockwise direction to move the aerial vehicle laterally with respect to the direction of the jet stream.

In an embodiment, the outer envelope of the altitude movement device is shaped as an air foil. A rotational motor can be connected to the outer envelope to rotate the outer envelope one-hundred and eighty degrees between two perpendicularly oriented positions with respect to the he direction of the jet stream to propel the vehicle laterally with respect to the direction of the jet stream.

In accordance with another aspect of the present invention, disclosed is a three-vehicle control system for navigating a primary aerial vehicle in a jet stream. The control system can comprise of a primary wind speed sensor on the primary vehicle for measuring wind speed; a port side wind speed sensor on a port side aerial vehicle for measuring jet stream wind speed on one side of the primary sensor; a starboard side wind speed sensor on a starboard side aerial vehicle for measuring jet stream wind speed on the other side of the primary sensor; a calculation module in communication with the primary wind speed sensor, the port side wind speed sensor, and that starboard side wind speed sensor for determining a maximum jet stream wind speed vector from the respective primary wind speed sensor, port side wind speed sensor, and the starboard side wind speed sensor, wherein the maximum wind speed vector has a direction and magnitude toward a location of a maximum wind speed of the jet stream; and a lateral movement controller configured to control lateral movement of the primary aerial vehicle and move the primary aerial vehicle with respect to the direction and magnitude of the maximum wind speed vector.

In an embodiment, a transceiver is in communication with the calculation module for receiving measurement signals from the port side wind speed sensor and the starboard side wind speed sensor. The lateral movement controller can be configured to control the lateral movement of the primary aerial vehicle in the direction and magnitude of the maximum wind speed vector. The lateral movement controller can be configured to communicate instructions for lateral movement to the port side aerial vehicle and the starboard side aerial vehicle so that the port side aerial vehicle and the starboard side aerial vehicle move in unison with the primary aerial vehicle.

In an embodiment, the port side aerial vehicle and the starboard side aerial vehicle are each lighter-than-air aerial vehicles. In such embodiments, a powered aerial vehicle could use the port side aerial vehicle and the starboard side aerial vehicle to navigate in the jet stream. In an embodiment, the port side aerial vehicle and the starboard side aerial vehicle each further can comprise an altitude movement device, wherein the altitude movement device comprises one or more ballonets within an outer envelope with the one or more ballonets configured to control buoyancy.

In an embodiment, the primary aerial vehicle can be a lighter-than-air aerial vehicle with an altitude movement device, wherein the altitude movement device comprises of one more ballonets within an outer envelope configured to control buoyancy of the primary aerial vehicle. The primary aerial vehicle can comprise an apparent wind generating device controlled by an apparent wind controller for creating apparent wind.

The apparent wind generating device can comprise one chosen from a motorized propeller oriented perpendicular to the direction of the jet stream and a drag balloon. The primary aerial vehicle can comprise a lateral movement device in communication with the lateral movement controller. The lateral movement device can comprise one chosen from: a rotational motor connected to the outer envelope of the lighter-than-air aerial vehicle to rotate the outer envelope about a vertical axis to propel the primary aerial vehicle laterally by virtue of the Magnus Effect; and an air foil.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Disclosed herein are systems and methods for mapping and navigating in a jet stream. As previously described, there is an imperfect understanding of the jet stream due to the lack of real-time data. Instead, numerous discrete observations are taken and compiled to predict the path and characteristics of the jet stream. The current state of the art is to use weather balloons, which rise and fall over a brief 100-200 mile path leaving much of the jet stream unmeasured. In locations where there are not terrestrial launching pads for the balloons, such as the vast Pacific ocean, the jet stream is left virtually unmeasured. This disclosure presents a novel solution for mapping and navigating in the jet stream.

In order to circumnavigate the globe through the jet stream, the unmanned aerial vehicle (UAV) must travel through the air spaces of many countries. When this is done with comparatively large UAVs or objects (e.g., airplanes, air ships, giant air balloons), and without the appropriate authorizations, there is a high risk of them getting shot down. Many may remember the incident of the alleged "spy balloons" that were shot down over the continental United States in 2023. This means that the size of the object matters.

It has become internationally accepted, however, for UAVs in the form of weather balloons to enter into a country's airspace. They typically carry very light payloads of only a few pounds. And, there are too many of them to shoot down. The instant disclosure incorporates a payload that can be conveyed by a UAV in the form of a lighter-than-air vehicle ("LAV") that varies in size from double to approximately the size of a weather balloon, depending on the embodiment, in order to be as unobtrusive as possible. In one embodiment, the LAV that is roughly 80 feet in diameter. While larger than a big weather balloon that is typically 28 feet in diameter, an 80 foot LAV can carry a payload of 500 pounds, which is sufficient for our purposes, but not large enough that when viewed from a distance to be considered a menace. Other embodiments, however, can get the diameters down to 40 feet and 35 feet-nearly mimicking the size of a weather balloon. Most importantly, in all of the embodiments, if the LAV is lost or shot down, the cost is minimal compared to larger full-powered UAVs.

The methods and solutions described herein for mapping and navigating the jet stream can be used with any UAV, but has particular benefits for low-power aerial vehicles, especially LAVs, such as balloons.

Figure 1:
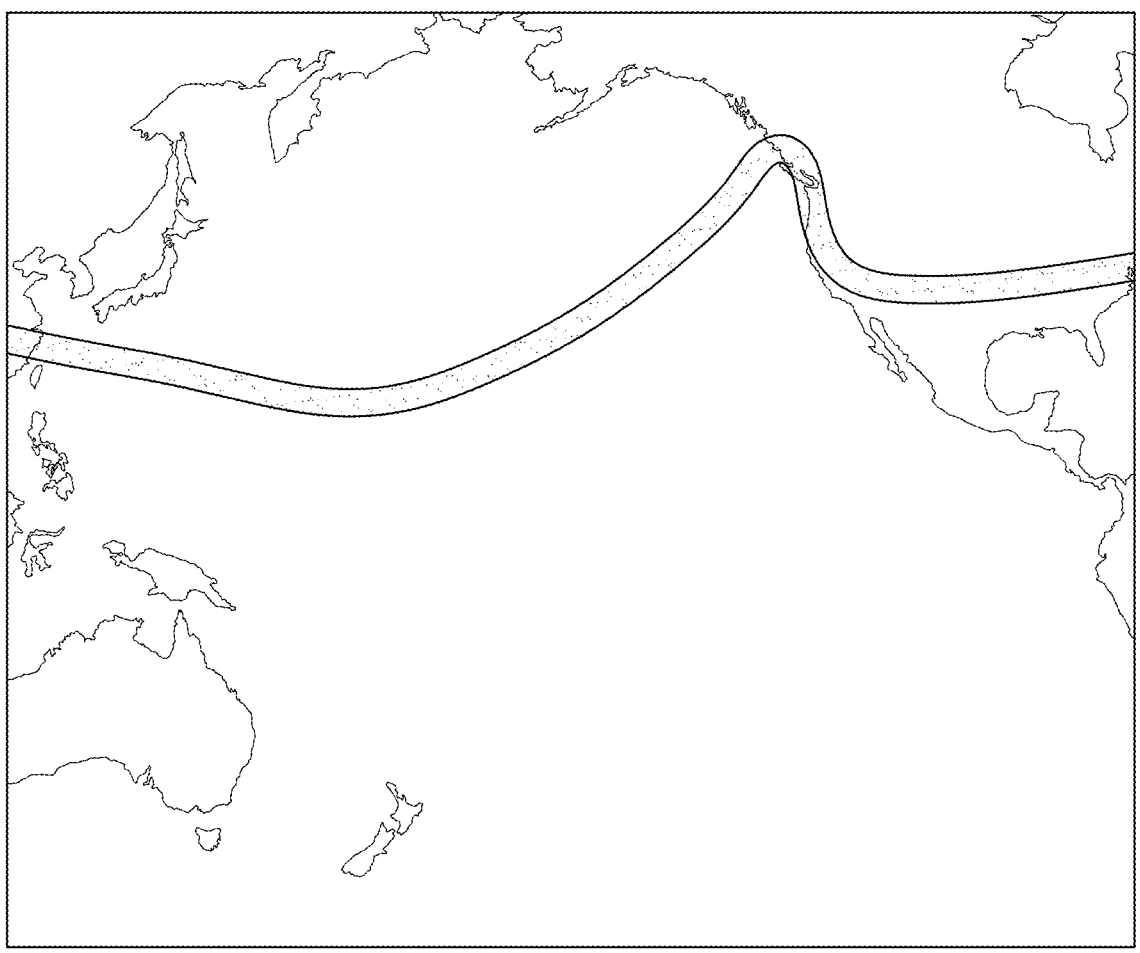
FIG. 1 is an illustration of the jet stream over the Pacific Ocean and the North American continent.

Referring to FIGS. 1-5, shown is an illustration of the jet stream over the Pacific Ocean and the North American continent followed by the wind speed profiles of various portions the jet stream. Any portion of jet stream can be broadly characterized as one of four portions based on its path. As shown in FIG. 1, a long generally straight section traverses over the Pacific Ocean. A "disappearing section" can be seen off the coast where the jet stream cannot be detected. Instead of "disappearing", this disclosure suggests that standard convention views that the jet stream has winds above 57 mph. Instead of disappearing, the jet stream more likely dips below that threshold. The jet stream is a continuous rapid flow of air as indicated by constant pressure lines on jet stream maps. The jet stream continues in FIG. 1 to the North American coast where it abruptly curves downward along the shore where it later gently curves inland.

Figure 2:
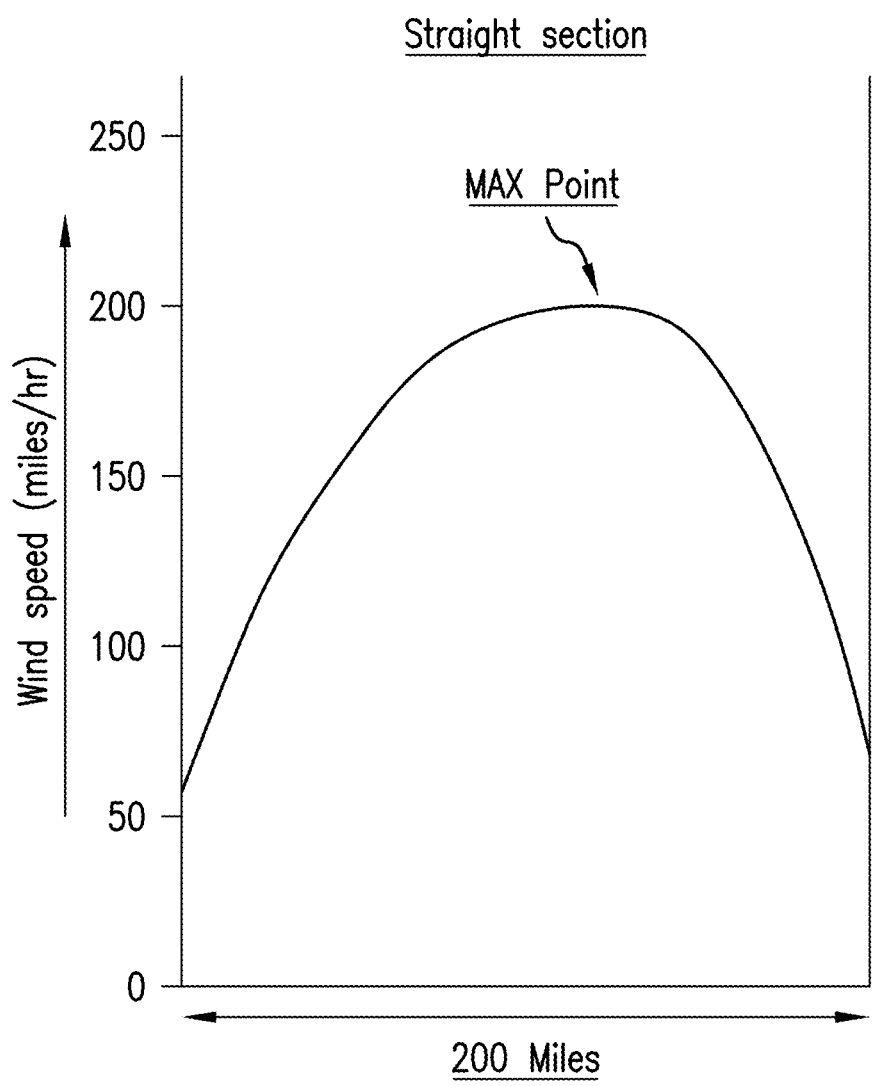
FIG. 2 is an exemplary wind speed profile of a generally straight section of the jet stream.
Figure 3:
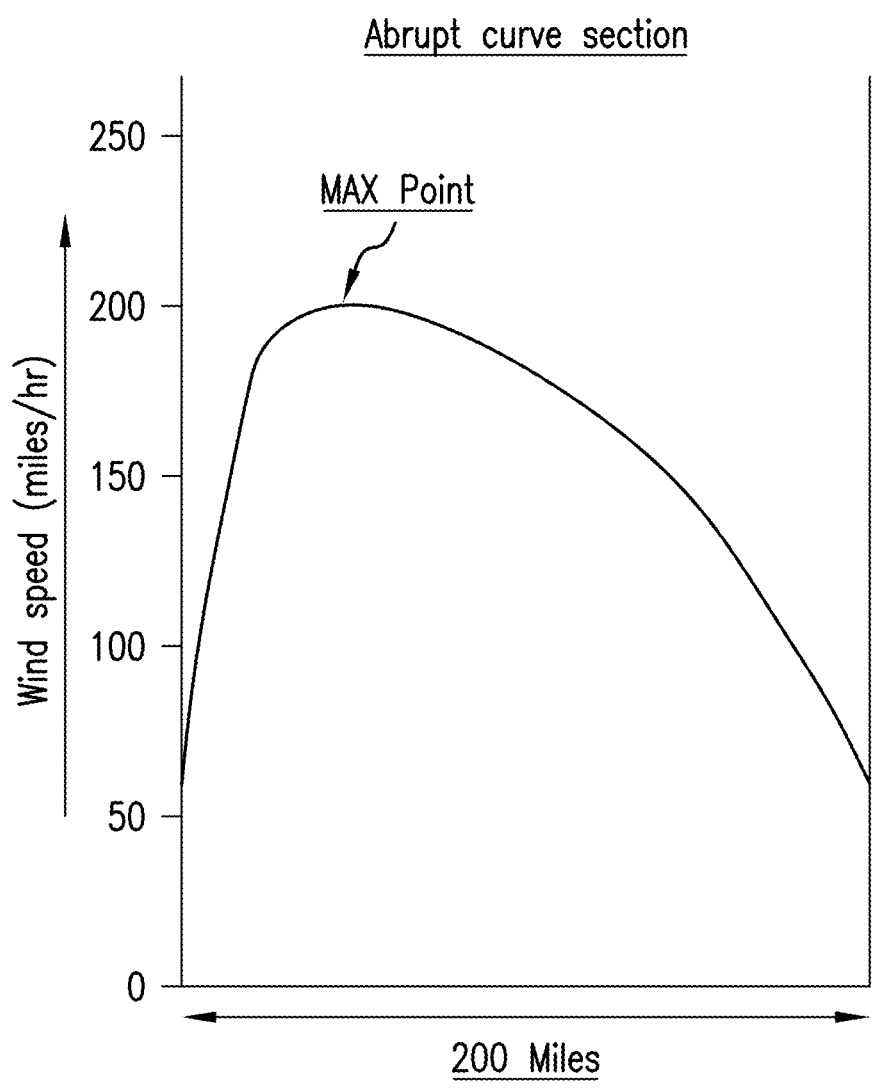
FIG. 3 is an exemplary wind speed profile an abrupt curved section of the jet stream.
Figure 4:
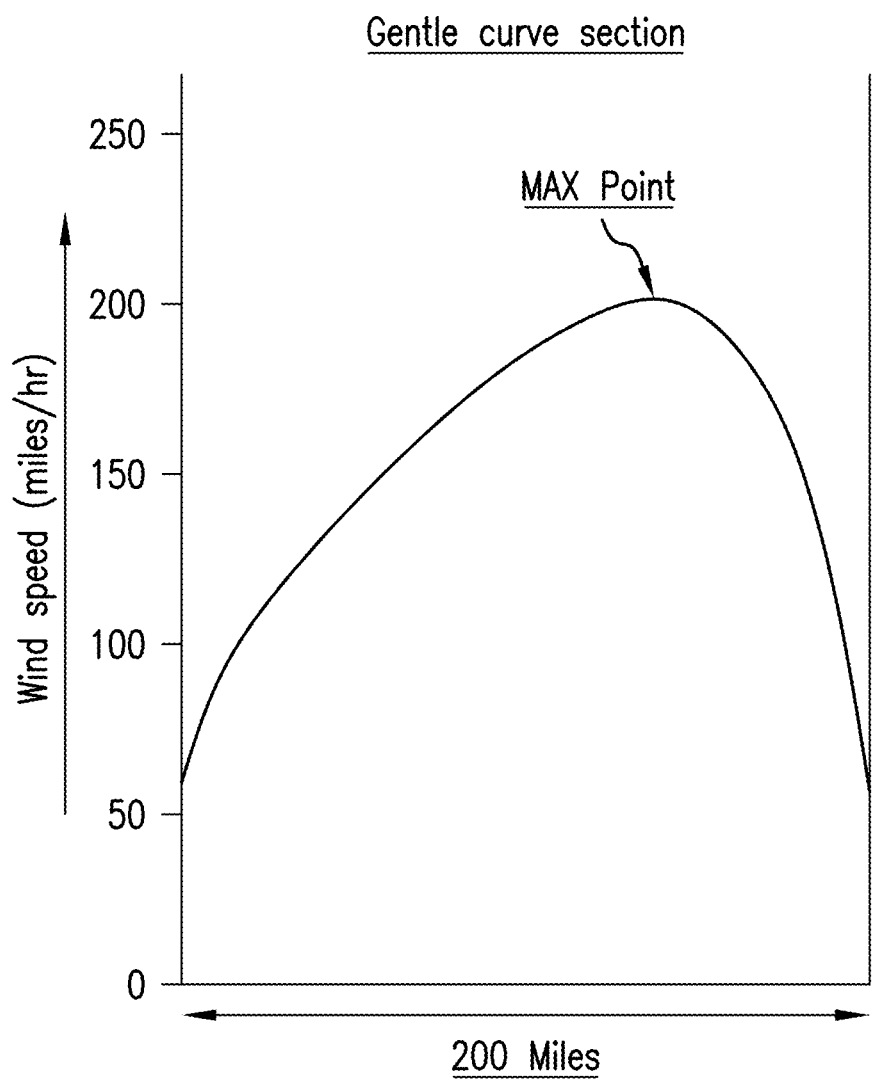
FIG. 4 is an exemplary wind speed profile of a gentle curved section of the jet stream.
Figure 5:
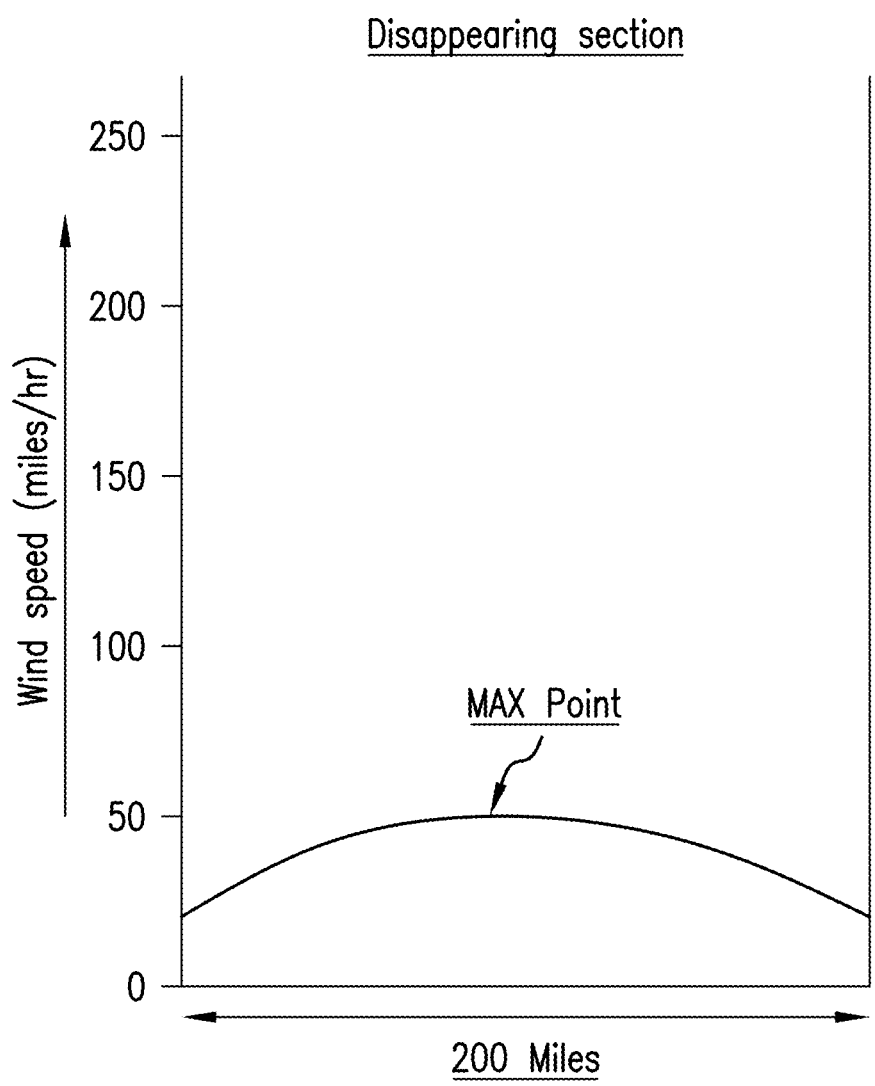
FIG. 5 is an exemplary wind speed profile of a "disappearing" section of the jet stream.

FIGS. 2-4 show the wind speed profiles for these sections of the jet stream. As can be seen the jet stream at each location has an inner area of maximum speed slowing downward towards the edges. The area of maximum speed may be in the center of the jet stream, as shown in the straight section of FIG. 2, skewed to the left, port side of the jet stream, as shown in FIG. 3, or skewed to the right, starboard side of the jet stream, as shown in the gentle curved section, as shown in FIG. 4. This disclosure proposes to navigate the jet stream by following the path of the maximum wind speed or maximum pressure lines to maintain the primary vehicle along the path of the maximum wind speed.

By navigating in this manner, side-to-side in the jet stream, the UAV, including an LAV, such as a balloon, ought to be able to circumnavigate the globe by following the maximum wind speed path of the jet stream. Real-time geo-position and jet stream measurements can be communicated to a base station for live mapping and analysis of the jet stream to aid other aircraft in navigation and in weather forecasting.

This disclosure will first discuss a novel method of moving an LAV, laterally, side-to-side with respect to the direction of the wind or the jet stream and then combine a trio of such UAVs or LAVs to navigate the jet stream around the world.

Lateral Movement and Control

Figure 6:
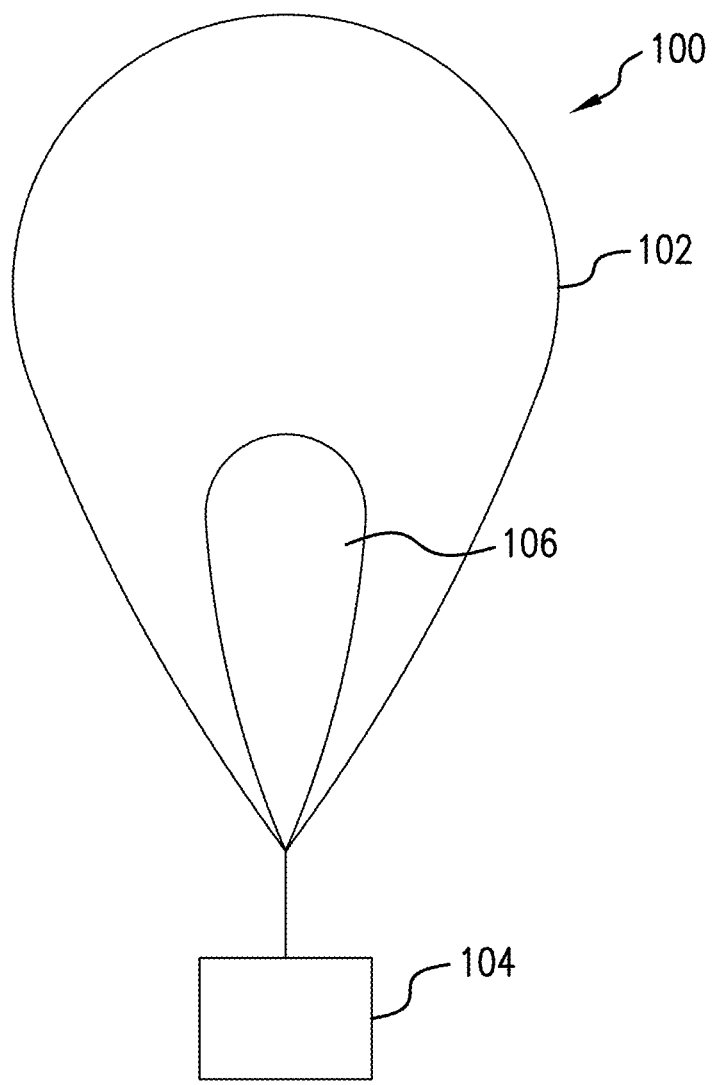
FIG. 6 is a general depiction of an aerial vehicle implemented as a lighter-than-air vehicle ("LAV") according to this disclosure.

FIG. 6 shows an exemplary aerial vehicle 100 implemented as an LAV balloon. Aerial vehicle 100 comprises of an outer envelope 102 having suspended therefrom a gondola 104. Outer envelope 102 is typically filled with hydrogen or helium to produce the lift necessary to raise aerial vehicle 100 off the ground. Gondola 104 can comprises the hardware and software necessary to navigate aerial vehicle 100 and the payload.

Altitude or buoyancy of aerial vehicle 100 is controlled by one or more ballonets 106. Outside air can be pumped into ballonet 106 to increase the total mass of aerial vehicle 100 to cause it to descend or air can be released from ballonet 106 to cause aerial vehicle to ascend. The more challenging problem is to navigate aerial vehicle 100, implemented as an LAV balloon or other aerial vehicle, with limited power laterally, side-to-side while maintaining a heading along the path of maximum wind speed or constant pressure lines in the jet stream.

First, what is needed is a device to generate apparent wind. Apparent wind is the wind experienced by UAV 100 relative to the direction of the wind in the jet stream. Then, what is needed is a way to move the UAV 100 laterally, side-to-side with respect to the direction of the jet stream. Disclosed herein are devices, systems, and methods for lateral movement of aerial vehicle 100 in the following ways: 1.) a motorized propeller oriented perpendicularly with respect to the direction of the jet stream; 2.) the Magnus effect; and 3.) the air-foil effect.

1.) the Motorized Propeller.

Figure 7:
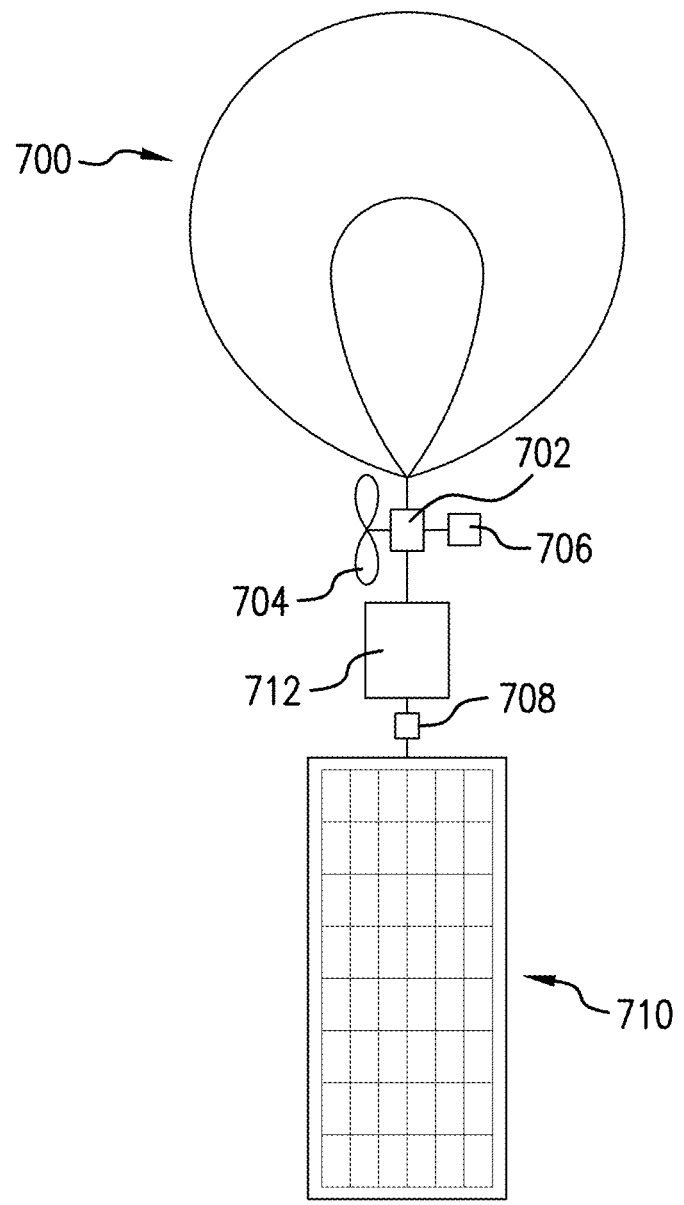
FIG. 7 is the LAV of FIG. 6 with one implementation for lateral movement according to this disclosure.

Turning to FIG. 7, the simplest embodiment for moving an LAV 700 laterally in the jet stream is using a propeller motor 702 to power a propeller 704 oppositely connected to a tail fin 706, which generates high torque for stabilization. Connected below propeller motor 702 is the gondola, which comprises of a payload 708 and connected below it is a solar panel 710 with ancillary components to generate the electricity to charge a battery (not shown) necessary to power propeller motor 702. A rotational motor 712 is connected beneath propeller motor 702 to rotate propeller 704 one-hundred and eighty degrees between the two perpendicularly oriented positions with respect to the jet stream to allow LAV 700 to move laterally, side-to-side in the jet stream.

2.) the Magnus Effect.

Bernoulli's principle states that an increase in the speed of a fluid occurs simultaneously with a decrease in static pressure or the potential energy of the fluid. The Magnus effect is a particular manifestation of Bernoulli's principle in the case of a spinning object in a fluid. With air behaving as a fluid, a spinning object, e.g. a ball, moving through the air drags some of the air around with it. Viewed from the position of the ball, the air is rushing by on all sides. The drag of the side of the ball turning into the air (into the direction the ball is traveling) retards the airflow, whereas on the other side the drag speeds up the airflow. Greater pressure on the side where the airflow is slowed down forces the ball in the direction of the low-pressure region on the opposite side, where a relative increase in airflow occurs. In other words, a ball spinning on an axis perpendicular to a direction of travel through the air will move laterally. The direction of lateral movement is dictated by the direction of spin. With respect to FIG. 6, outer envelope 102 of aerial vehicle 100 characterized as a ball with a direction of travel in the flow of the jet stream, spinning outer envelope 102 clockwise about a vertical axis will cause aerial vehicle 100 to move laterally to the left, port side of aerial vehicle 100. Conversely, spinning outer envelope 102 counter-clockwise about a vertical axis will cause aerial vehicle 100 to move laterally to the right, starboard side of aerial vehicle 100.

Figure 8:
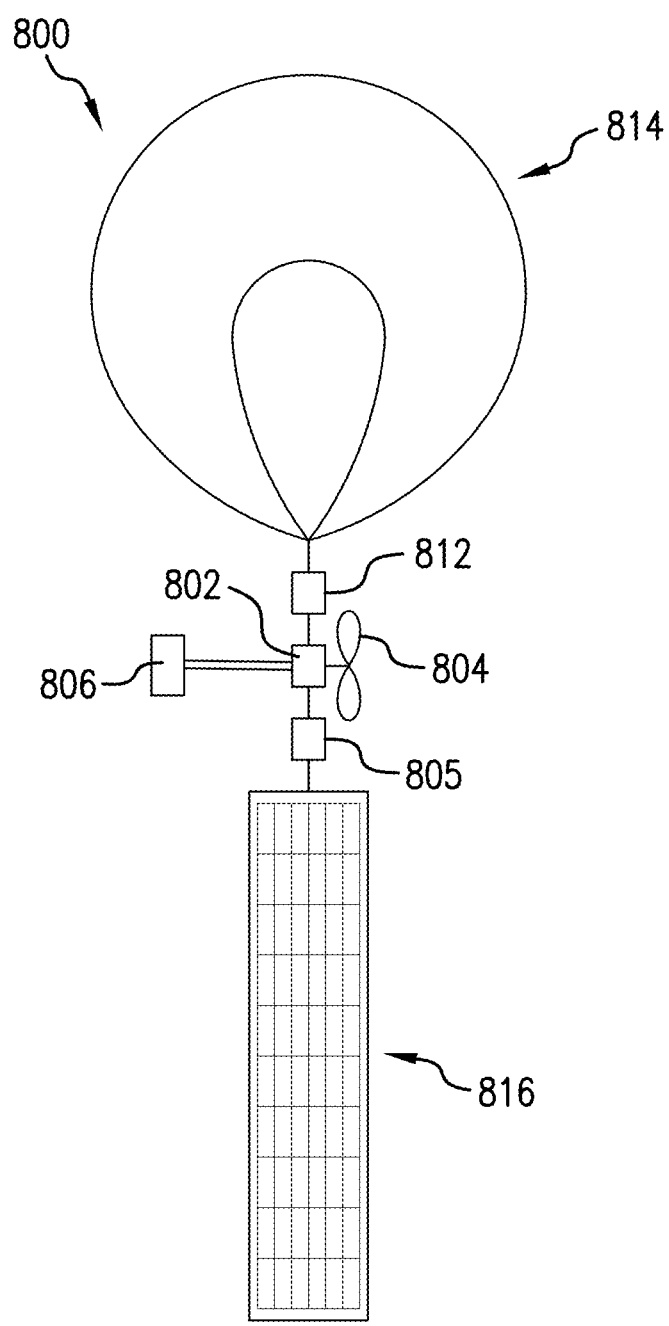
FIG. 8 is the LAV of FIG. 6 with another implementation for lateral navigation according this disclosure.

Turning to FIG. 8, shown is an LAV 800 that implements the Magnus effect to laterally move of LAV 800 in the jet stream. In this implementation, the gondola comprises of a propeller motor 802 that powers a propeller 804, which is oriented in the direction of the jet stream to generate apparent wind from forward or reverse movement with respect to the direction of the jet stream. An oppositely connected tail fin 806 generates high torque to stabilize LAV 800. A payload 805 can be connected below propeller motor 802. Connected above propeller motor 802 is a spinning motor 812 with its shaft connected to an outer envelope 814. When LAV 800 needs to move laterally to the left, port side of LAV 800, propeller motor 802 powers propeller 804 to generate apparent wind then output shaft of spinning motor 812 spins outer envelope 814 in the clockwise direction. When LAV 800 needs to move laterally to the right, starboard side of LAV 800, propeller motor 802 powers propeller 804 to generate apparent wind then output shaft of spinning motor 812 spins outer envelope 814 in the counter-clockwise direction. In each situation, the apparent wind with the Magnus Effect of the rotating outer envelope 814 drives LAV 800 laterally with respect to the direction of jet stream. The rotational speed of the output shaft of spinning motor 812, which translates to the speed of rotation of outer envelope 814, corresponds to the speed of the lateral movement. To go faster, the output shaft of spinning motor 812 merely needs to spin faster. To slow down, the output shaft of spinning motor 812 merely slows down.

3.) the Airfoil Effect.

An airfoil is a streamlined body with a leading and trailing edge that is capable of generating significantly more lift than drag. When the leading edge is oriented at a suitable angle, a solid body moving through the air deflects the oncoming air resulting in a force on the airfoil in the direction opposite of the deflection known as the aerodynamic force that can be resolved into two components: lift (the force perpendicular to the free air flow) and drag (the air resistance force parallel to the free air flow). The lift of an airfoil is the result of the angle of attack, which is the angle between a reference line on the airfoil and the vector representing the relative motion of the air foil. The greater the angle of attack, the greater the lift, and vice versa. These are well-known aerodynamic principles that allow airplanes to fly. In this implementation, the airfoil is oriented perpendicularly for lateral movement, rather than parallel for vertical movement in an airplane.

Figure 9:
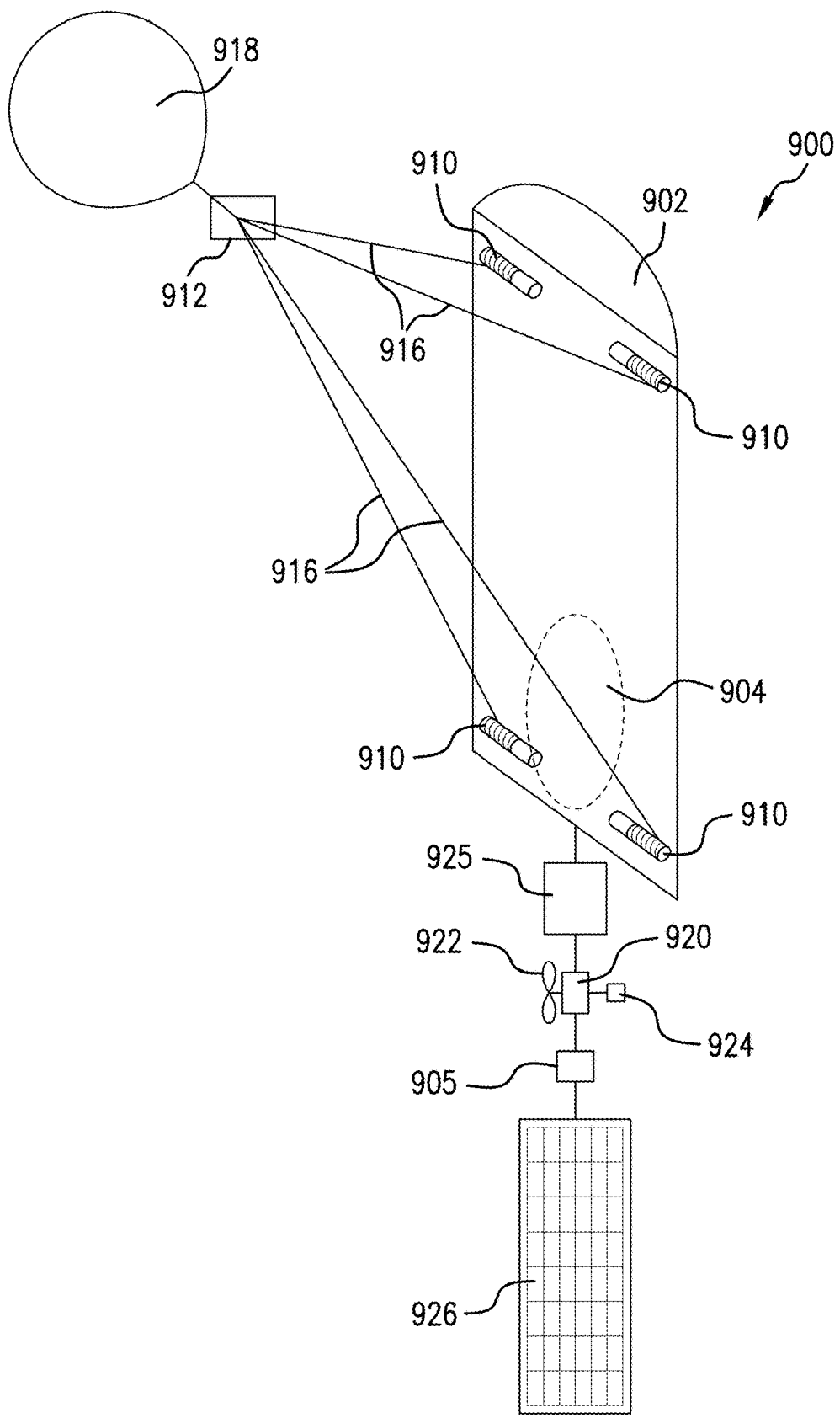
FIG. 9 is the LAV of FIG. 6 with the outer envelope shaped as an airfoil and with another implementation for lateral navigation according to this disclosure.

FIG. 9 shows LAV 900 implemented as a balloon with an outer envelope 902 shaped as a perpendicularly oriented airfoil surrounding a ballonet 904 to adjust the weight of LAV 900 to ascend and descend. Outer envelope 902 is shaped to present a vertically oriented airfoil that when oriented at a suitable angle, will deflect the oncoming air resulting in a force on the airfoil in the direction opposite of the deflection. In this instance, the lift, which is force perpendicular to the free air flow, will push LAV 900 laterally. The speed of the lateral movement can be increased or decreased by adjusting the angle of attack, which is the angle between a reference line on the airfoil and the vector representing the relative motion of the airfoil. The greater the angle of attack, the greater the lateral speed, and vice versa.

In an embodiment, tethers 916 may be necessary to help outer envelope 902 retain its shape as an airfoil. In one example, four tether drive mechanisms 910 can be positioned on corresponding corners of outer envelope 902 with each tether drive mechanism 910 comprising a motor to drive a winch attached to tether 916. Increasing or decreasing the length of tether 916 changes the position of the airfoil to keep it stable and maintain upright and in line to maximize the effect of apparent wind (like a kite where you adjust the string to steer). Tether drive mechanisms 910 keep airfoil from flipping over during lateral movement. In another embodiment, the tether drive mechanisms 910 can be consolidated and replaced with a single tether drive mechanism 912 positioned at the end of tethers 916 between a drag balloon 918 that is used to generate the apparent wind (discussed below). In either scenario, a laser gyro could be used to detect tilting of the airfoil, then tether drive mechanisms 910 or single tether drive mechanism 912 can straighten outer envelope 902 of the airfoil out.

LAV 900 requires apparent wind for the airfoil to drive LAV 900 laterally. In an embodiment, the gondola comprises of a propeller motor 920 powers a propeller 922, which is oriented in the direction of the jet stream to generate apparent wind. An oppositely connected tail fin 922 generates high torque to stabilize LAV 900. A payload 905 can be connected below propeller motor 920. Connected above propeller motor 920 is a rotational motor 925 with its shaft connected to outer envelope 902. Rotational motor 925 rotates outer envelope 902 so that the angle of attack of the airfoil is oriented to propel LAV 900 in the appropriate lateral direction.

In an alternative embodiment, propeller 922 and propeller motor 920 are replaced with drag balloon 918 to generate the apparent wind. The wind speed across the thickness of the jet stream changes rapidly over a short distance. The wind speed differential can be about 4 knots with the height change of only 100 feet. This sharp increase or decrease of wind speed over a short distance in height means drag balloon 918 deployed above outer envelope 902 can create significant drag, which translates to apparent wind at outer envelope 902, which can be used to drive LAV 900 laterally while a rotational motor 924 with its shaft connected to outer envelope 902 rotates outer envelope 902 to adjust the angle of attack of the airfoil to keep LAV 900 in the appropriate position.

Multiple different ways for generating apparent wind and driving lateral movement have been disclosed. Each of these implementations have advantages and disadvantages. Each LAV herein disclosed needs a gondola to be able to carry a payload of measuring and operational equipment. This equipment needs a power source of sufficient size. The simplest approach using a motorized propeller oriented perpendicularly with respect to the direction of the jet stream, as shown in FIG. 7, can use a solar panel 710 to charge a battery in payload 708 to power propeller motor 702 and the other measuring and operational equipment. Referring to FIG. 8, a solar charged battery 816 can also be used to power propeller motor 802, spinning motor 812, and the other measuring and operational equipment. In these embodiments, the diameter of the outer envelope may need to be 80 feet to carry the weight of the payload.

In the embodiments with a drag balloon, FIG. 9, for example, a smaller solar charged battery 926 can be used because the propeller is replaced with the drag balloon to generate apparent wind. In this embodiment, the diameter of outer envelope of the LMV could be reduced to 40 feet in diameter and still be able to carry the required payload. This is nearly half the size of the embodiments disclosed in FIGS. 7-8.

In other embodiments, outer envelope 902 can be shaped according to embodiment of outer envelope 102. Rotational motor 925, as previously described can be connected thereto and drag balloon 918 can be connected to at the payload or anywhere underneath outer envelope 902. A wind turbine and/or solar panel 926 can be connected for power generation. As previously described, drag balloon 918 helps to create the apparent wind and rotational motor 925 spins outer envelope 902 for lateral movement.

In other embodiments, the solar panels can be replaced with a wind-turbine to generate the electricity to power spinning motors used to spin outer envelope to drive the LMV laterally using the Magnus Effect. The apparent wind spins the rotors of the turbine to generate electricity to charge batteries used to power the devices. In such embodiments, the balloon size could be reduced to 35 feet in diameter and still carry the required payload.

Finally, by combining the drag balloon to generate apparent wind with the airfoil embodiments to for lateral movement, the rough shape of the airfoil could be about 30 feet, which is nearly the same size as a weather balloon. Tether drive mechanisms 910 or 912 could be implemented as devices similar to motorized fishing reels powered by small electric motors with lines near the gauge of fishing line. The small amount of power needed for such devices could be powered by small solar panels to charge small batteries. It may be that the configuration of outer envelope in the airfoil shape is self-stabilizing like a kite and tether drive mechanisms 910 are unnecessary.

Finally, it should also be noted that as battery technology improves, it may be possible to power circumnavigation flight off of disposable batteries, thus dispensing of the need for power generating equipment, such as solar cells and wind turbines.

It should be understood that aerial vehicles discussed herein and in connection with FIGS. 6-9 (i.e. LAVs 100, 700, 800, and 900) can be implemented in any combination. Each aerial vehicle can have an altitude movement device comprising of a ballonet within an outer envelope with the ballonet configured to control buoyancy and an apparent wind generating device combined with the altitude movement device to generate an apparent wind. The outer envelope can be shaped as a airfoil or have a round shape, as discussed above. The apparent wind generating device can be the motorized propeller oriented to propel the vehicle laterally with respect to the direction of the jet stream. On the other hand, the apparent wind generating device can be the motorized propeller oriented parallel to the direction of the jet stream to generate the apparent wind and combined with any of the lateral movement devices discussed above, such as the airfoil or spinning outer envelope. Finally, the apparent wind generating device can be the drag balloon implemented with any of the lateral movement devices discussed above.

Navigating the Jet Stream with a Trio of Vehicles.

Figure 10:
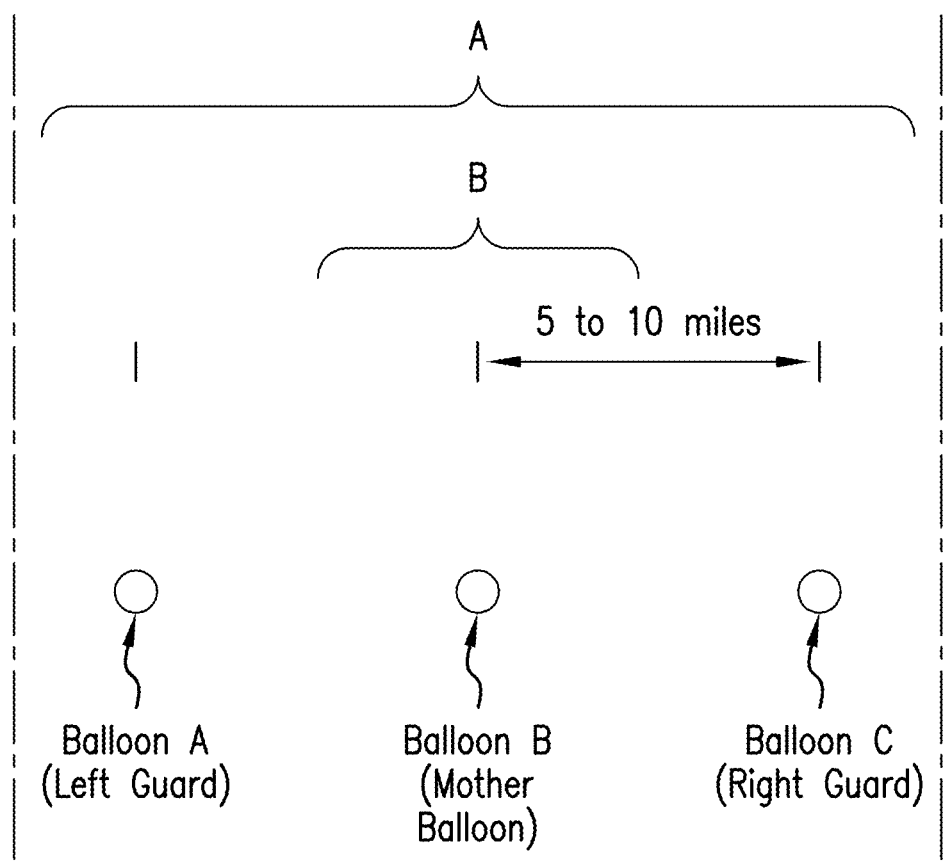
FIG. 10 illustrates three aerial vehicles according to this disclosure maneuvering along a path of maximum wind speed in the jet stream.

With multiple low powered options for moving aerial vehicles laterally within a jet stream disclosed, the discussion turns to using navigating aerial vehicle along the path of maximum wind speed in the jet stream. FIG. 10 shows three aerial vehicles 1000a, 1000b, and 1000c navigating within jet stream with aerial vehicle 1000b following the general path of maximum wind speed. Each aerial vehicle can be implemented in any combination of the foregoing embodiments with the importance being on moving laterally in the jet stream.

As discussed above in reference to FIGS. 1-5, the meandering of the jet stream can be characterized in several different ways where the area of maximum speed varies from the center to either side. Navigating the jet stream in these various sections requires different strategies. For example, to navigate the straight section of the jet stream can involve (i) following the forecasted direction and avoid rapid meandering; (ii) using a GPS device on board each of the three aerial vehicles 1000a,b,c to ascertain the air speed of each and move laterally so that aerial vehicle 100b is located near the maximum speed; or (iii) using the air speed calculations from the three aerial vehicles 1000a,b,c to laterally move side-to-side crisscrossing the area of maximum speed to maintain general alignment of aerial vehicles 1000b in the center.

As an example of the latter method, aerial vehicle 100a measures the Jet Stream wind speed to be 135 knots, aerial vehicle 100b measures it to be 145 knots, and aerial vehicle 100c measures it to be 155 knots. It would seem apparent that the three aerial vehicle 100a,b,c are at the left side of the maximum point. Aerial vehicles 100a,b,c then need to move laterally to the right for aerial vehicle 100b to reach the max point. Thereafter, aerial vehicles 100a,b,c continue moving to the right, crossing the "MAX" point for a short distance. After that, aerial vehicles 100a,b,c need to change directions one again, laterally moving to the left to cross the "MAX" point again for a short distance. The maneuvers of the above would be repeated again and again, for as long as it can be done, for the balloons to crisscross the "MAX" point frequently. This maneuver has two advantages. It avoids straying by staying near the center of the Jet Stream and trio travels at near maximum wind speed. Using this method, it is always possible to find the position of the aerial vehicles 100a,b,c by comparing the Jet Stream wind speed at each of aerial vehicles 100a,b,c.

Navigating the jet stream in an abrupt curve section can be done similar to the straight section, except, do not follow the max point, instead, stay to the right side of the max, and at a distance, because the max point in this section is too close to the left side edge of the jet stream, as shown in FIG. 3. It is likely that in an abrupt curve section, there exists a greatest chance of aerial vehicle 100a,b,c straying off the jet stream.

Navigating the jet stream in a disappearing section can be done similar to the straight section except, instead of chasing the max point in this section, try to follow one of the constant pressure lines in the jet stream map, aiming at the max point of the reappearing jet stream section. Finally, navigating a gentle curve section of the jet stream can be done in the same way as the in the straight section.

Maneuvering each of aerial vehicle 100a,b,c independently and together requires a computerized control system that can preferably be implemented autonomously.

Figure 11:
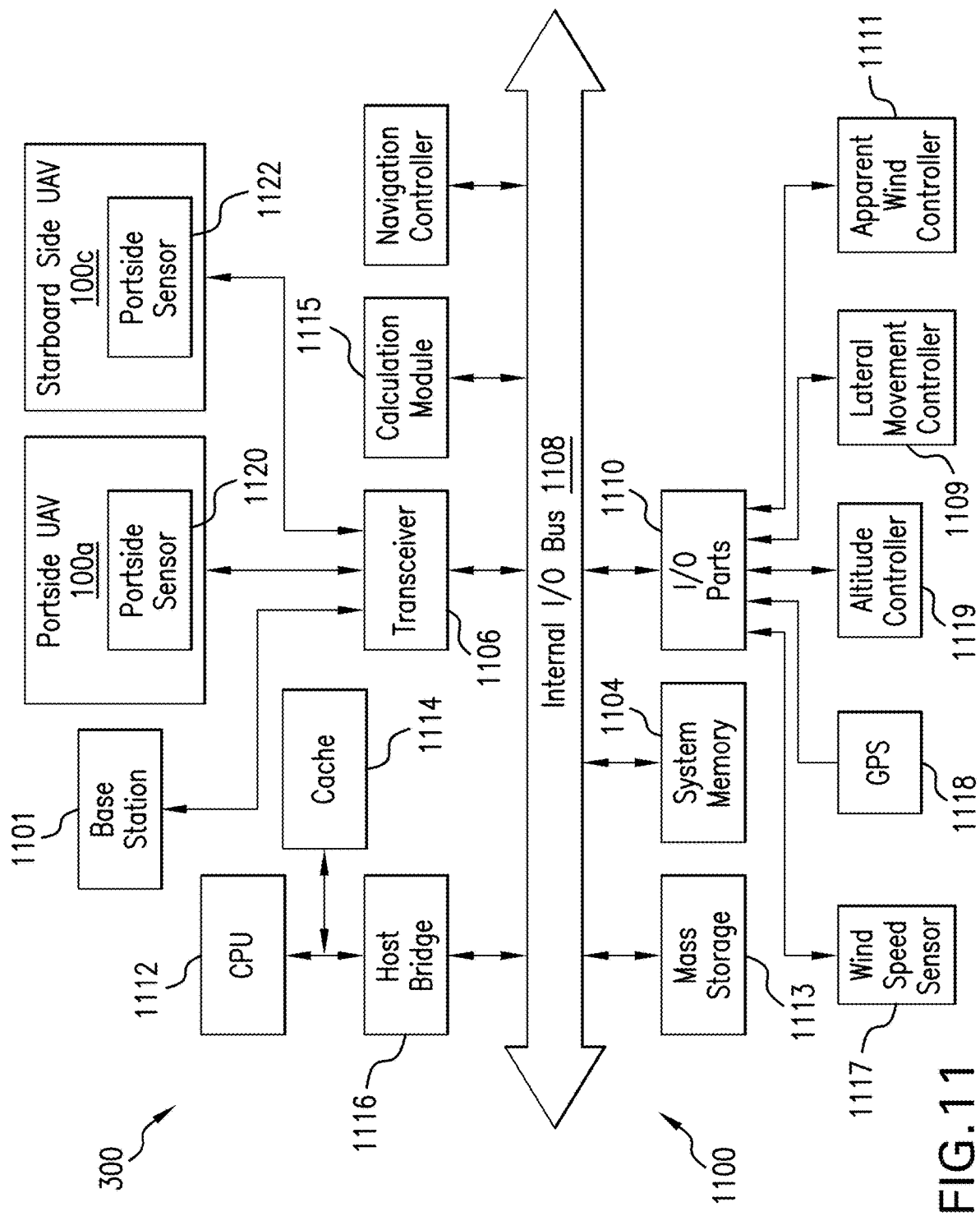
FIG. 11 is a block diagram of hardware and software for jet stream navigation for the aerial vehicles according to this disclosure.

FIG. 11 shows an exemplary computing platform for executing the processing functions necessary to drive and navigate an aerial vehicle 100 and the trio of aerial vehicles 100a,b,c. For convenience, only aerial vehicle 100b will be described with the understanding that aerial vehicles 100a,c have substantially the same equipment. In one implementation, a processor 1100 comprises a system including central processing unit (CPU) 1112, a system memory 1104, transceiver 1106 and one or more software applications and drivers enabling or implementing the methods and functions described herein. Hardware system includes a standard I/O bus 1108 with I/O Ports 1110 and mass storage 1113 (which can also be a non-volatile Flash Memory) coupled thereto.

Bridge 1116 couples CPU 1112 to I/O bus 1108. These elements are intended to represent a broad category of computer hardware systems, including but not limited to general-purpose computer systems based on the Pentium processor manufactured by Intel Corporation of Santa Clara, Calif., as well as any other suitable processor.

Elements of the computer hardware system or processor 1100 perform their conventional functions known in the art. In particular, transceiver 1106 is used to provide communication between CPU 1112 the other aerial vehicles 100b,c and a base station 1101. Mass storage 1113 can be provided and used to provide permanent storage for the data and programming instructions to perform the above-described functions implementing the test to be carried, whereas system memory 1104 (e.g., DRAM) is used to provide temporary storage for the data and programming instructions when executed by CPU 1112. I/O ports 1110 are one or more serial and/or parallel communication ports used to provide communication between additional peripheral devices, such as altitude controller 1107, lateral movement controller 1109, apparent wind controller 1111, and GPS 1118.

Processor 1100 may include a variety of system architectures, and various components of CPU 1100 may be rearranged. For example, cache 1114 may be on-chip with CPU 1112. Alternatively, cache 1114 and CPU 1112 may be packed together as a "processor module," with CPU 1112 being referred to as the "processor core." Furthermore, certain implementations of the claimed embodiments may not require nor include all the above components. Also, additional components may be included, such as additional processors, storage devices, or memories.

The foregoing processors 1100 on aerial vehicles 100a,b,c are used to implement a three-vehicle control system for navigating a primary aerial vehicle 100b in a jet stream. This control system comprises of a primary wind speed sensor 1117 on the primary, aerial vehicle 100b for measuring wind speed. The control system receives through transceiver 1106 information from a port side wind speed sensor 1120 on a port side aerial vehicle 100a for measuring wind speed on one side of primary, aerial vehicle 100b. A starboard side wind speed sensor 1122 on a starboard side, aerial vehicle 100c for measuring wind speed on the other side of the primary, aerial vehicle 100b.

A calculation module 1115 in communication with primary wind speed sensor 1117, port side wind speed sensor 1120, and starboard side wind speed sensor 1122 uses the information to determine a maximum wind speed vector from the respective primary wind speed sensor 1117, port side wind speed sensor 1120, and starboard side wind speed sensor 1122. This maximum wind speed vector has a direction and magnitude toward a location of the maximum wind speed of the jet stream.

With this information each processor 1100 in the respective aerial vehicles 100a,b,c can control the various output devices to navigate the jet stream. For example, processor can engage lateral movement controller 1109 configured to control the devices (e.g., the perpendicularly oriented propeller, the spinning motor, or rotation of the airfoil) used for lateral movement of aerial vehicle 100b to move with respect to the direction and magnitude of the maximum wind speed vector. In embodiments where apparent wind needs to be generated separately, for example, by operating the parallel oriented propeller in one of the embodiments described above, processor 1100 can use direct apparent wind controller 1107 to operate the same.

Simultaneously, processor 1100 in primary, aerial vehicle 100b can communicate to each portside UAV 100a and Starboard side UAV 100c to follow. Each of these can have their own onboard processor 1100 to make their own calculations or they could each be programed to take whatever actions necessary to maintain alignment with the primary, aerial vehicle 100b (e.g., speeding up or slowing down and tracking to the right or left as necessary). If the respective aerial vehicles 100a,b,c need to adjust the altitude, altitude controller 1119 is used to increase or decrease the amount of air in balloonet 106.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

We claim:

1. A three-vehicle control system for navigating a primary aerial vehicle in a jet stream, the control system comprising:
   a primary wind speed sensor on the primary vehicle for measuring jet stream wind speed;
   a port side wind speed sensor on a port side aerial vehicle for measuring jet stream wind speed on one side of the primary sensor;
   a starboard side wind speed sensor on a starboard side aerial vehicle for measuring jet stream wind speed on the other side of the primary sensor;
   a calculation module in communication with the primary wind speed sensor, the port side wind speed sensor, and that starboard side wind speed sensor for determining a maximum wind speed vector from the respective primary wind speed sensor, port side wind speed sensor, and the starboard side wind speed sensor, wherein the maximum wind speed vector has a direction and magnitude toward a location of a maximum wind speed of the jet stream; and
   a lateral movement controller configured to control lateral movement of the primary aerial vehicle and move the primary aerial vehicle with respect to the direction and magnitude of the maximum wind speed vector.

2. The control system of claim 1, and further comprising a transceiver in communication with the calculation module for receiving measurement signals from the port side wind speed sensor and the starboard side wind speed sensor.

3. The control system of claim 1, wherein the lateral movement controller is configured to control the lateral movement of the primary aerial vehicle in the direction and magnitude of the maximum wind speed vector.

4. The control system of claim 1, wherein the lateral movement controller is configured to communicate instructions for lateral movement to the port side aerial vehicle and the starboard side aerial vehicle so that the port side aerial vehicle and the starboard side aerial vehicle move in unison with the primary aerial vehicle.

5. The control system of claim 4, wherein the port side aerial vehicle and the starboard side aerial vehicle each further comprise an altitude movement device, wherein the altitude movement device comprises one or more ballonets within an outer envelope with the one or more ballonets configured to control buoyancy.

6. The control system of claim 5, wherein the primary aerial vehicle further comprises an apparent wind generating device controlled by an apparent wind controller for creating apparent wind.

7. The control system of claim 6, wherein the primary aerial vehicle further comprises a lateral movement device in communication with the lateral movement controller.

8. The control system of claim 1, wherein the port side aerial vehicle and the starboard side aerial vehicle are each lighter-than-air aerial vehicles.

9. The control system of claim 1, wherein the primary aerial vehicle is a lighter-than-air aerial vehicle with an altitude movement device, wherein the altitude movement device comprises of one more ballonets within an outer envelope configured to control buoyancy of the primary aerial vehicle.

10. The control system of claim 9, wherein the apparent wind generating device comprises one chosen from a motorized propeller oriented perpendicular to the direction of the jet stream and a drag balloon.

11. The control system of claim 10, wherein the lateral movement device comprises one chosen from: a rotational motor connected to the outer envelope of the lighter-than-air aerial vehicle to rotate the outer envelope about a vertical axis to propel the primary aerial vehicle laterally by virtue of the Magnus Effect; and an air foil.

12. A three-vehicle system for navigating a primary aerial vehicle in a jet stream using a port side aerial vehicle and a starboard side aerial vehicle, the system comprising:
   a primary wind speed sensor on the primary vehicle for measuring jet stream wind speed;
   a port side wind speed sensor on the port side aerial vehicle for measuring jet stream wind speed on one side of the primary sensor;

a starboard side wind speed sensor on the starboard side aerial vehicle for measuring jet stream wind speed on the other side of the primary sensor; and a lateral movement controller configured to control lateral movement of the primary aerial vehicle and move the primary aerial vehicle with respect to the direction and magnitude of the maximum wind speed vector.

13. The system of claim 12, wherein the lateral movement controller is in communication with an altitude movement device comprising of a ballonet within an outer envelope with the ballonet configured to control buoyancy; and an apparent wind generating device combined with the altitude movement device to generate an apparent wind.

14. The system of claim 13, wherein the apparent wind generating device is a motorized propeller oriented to propel the vehicle laterally with respect to the direction of the jet stream.

15. The system of claim 13, further comprising a rotational motor connected to the motorized propeller to rotate the motorized propeller between two-perpendicularly oriented positions with respect to the direction of the jet stream to propel the vehicle laterally with respect to the direction of the jet stream.

16. The system of claim 13, further comprising a rotational motor connected to the outer envelope to spin the outer envelope in either a clockwise or counter-clockwise direction to move the aerial vehicle laterally with respect to the direction of the jet stream, wherein the motorized propeller is oriented in the direction of the jet stream to generate apparent wind while the rotational motor spins the outer envelope.

17. The system of claim 13, further comprising a motorized stabilizing rotor combined to a tail extending from the motorized propeller.

18. The system of claim 13, wherein the apparent wind generating device is a drag balloon that extends at a higher altitude than the outer envelope.

19. The system of claim 13, further comprising a rotational motor connected to the outer envelope to spin the outer envelope in either a clockwise or counter-clockwise direction to move the aerial vehicle laterally with respect to the direction of the jet stream.

20. The system of claim 19, further comprising a rotational motor connected to the outer envelope to rotate the outer envelope one-hundred and eighty degrees between two perpendicularly oriented positions with respect to the direction of the jet stream to propel the vehicle laterally with respect to the direction of the jet stream.

21. The system of claim 13, wherein the outer envelope of the altitude movement device is shaped as an air foil.

* * * * *